United States Patent [19]
Kraus

[11] 3,788,713
[45] Jan. 29, 1974

[54] HYDROSTATIC THRUST BEARING

[75] Inventor: Charles E. Kraus, Austin, Tex.

[73] Assignee: Excelermatic, Inc., Rochester, N.Y.

[22] Filed: May 23, 1972

[21] Appl. No.: 256,143

[52] U.S. Cl.................... 308/160, 308/9, 308/172
[51] Int. Cl. .............................................. F16c 1/24
[58] Field of Search ...... 308/160, DIG. 4, 170, 171, 308/172, 164, 122, 9, 174, 175, 176

[56] References Cited
UNITED STATES PATENTS

| | | | |
|---|---|---|---|
| 3,382,014 | 5/1968 | Marley.................................. | 308/9 |
| 3,635,534 | 8/1969 | Barnett............................. | 308/160 |
| 3,495,886 | 2/1970 | Roberts............................. | 308/160 |
| 3,619,016 | 11/1971 | Kraus.................................. | 308/160 |
| 1,006,174 | 10/1911 | Anker-Holth....................... | 308/172 |

*Primary Examiner*—Charles J. Myhre
*Assistant Examiner*—R. H. Lazarus

[57] ABSTRACT

A hydrostatic thrust bearing for supporting a load member on a support member is disclosed wherein pressurized fluid is admitted into a cavity formed between opposed surfaces of the load and support members. Lands integral with the load and support members form an annular leakage path through which the pressurized fluid is permitted to escape from the cavity, at least one annular disc being disposed between the lands thereby dividing the leakage path into at least two parallel passages.

18 Claims, 9 Drawing Figures

PATENTED JAN 29 1974 3,788,713

HYDROSTATIC THRUST BEARING

BACKGROUND OF THE INVENTION

In hydrostatic thrust bearings a pressurized fluid is introduced in a space formed between opposed surfaces of a load member and a support member. The pressurized fluid is admitted to that space at a predetermined rate and permitted to escape through a path formed betwen opposite lands integral with the support and the load members thereby separating the support and load members from each other.

Such an arrangement is, for example, shown in this inventor's earlier U.S. Pat. No. 3,619,016, wherein pressurized fluid is admitted to a central cavity and escapes therefrom through a path formed between wide lands.

The energy required to operate such thrust bearings comprises the power necessary to drive a pump for the supply of the pressurized fluid and the energy consumed to overcome the shearing forces in the fluid between the support and load members. Most of the shearing losses occur in the fluid between the lands because of the small gap and a large difference in speed between the lands. The greater the gap between the lands, the smaller, of course, are the shear losses. The size of the gap, however, is limited by the load of the load member and the volume of pressurized fluid supplied to the bearing.

The losses due to shear in the fluid film in the land area are a square function of the difference in speed between the opposite land surfaces and if the fluid used has a high viscosity the losses caused by the shear are so high that the practical speed permitted by the bearing is quite limited.

SUMMARY OF THE INVENTION

The present invention provides a hydrostatic thrust bearing in which a pressurized fluid is admitted to a cavity between matching surfaces of a load member and a support member so that the load member is supported on the support member by the pressurized fluid. The support and load members have oppositely disposed lands forming a gap through which the fluid escapes and at least one annular disc is disposed between the lands to divide the fluid path between the lands into at least two parallel passages.

DESCRIPTION OF THE PREFERRED EMBODIMENTS

Figure 1:
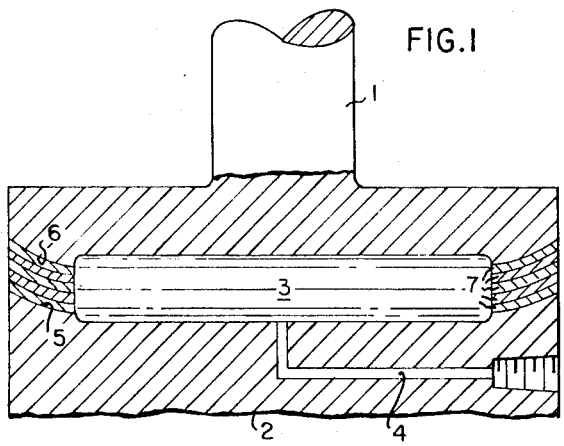
FIG. 1 shows schematically a thrust bearing according to the invention.

FIG. 1 shows schematically the arrangement according to the invention wherein a load member 1 is supported on a support member 2 by a hydrostatic bearing structure. Between the load and the support members 1 and 2 there is formed a cavity 3 to which pressurized fluid is admitted through a pressurized fluid passage 4. The pressurized fluid supports the load member 1 and is permitted to escape from the cavity 3 through annular passages defined between opposite land surfaces 6 and 5 formed on the load and support members 1 and 2. One or more annular discs 7 are disposed between the lands 5 and 6 thereby to form a number of parallel passages 8 (FIG. 2) between the discs 7 and adjacent the land surfaces 5 and 6.

As shown in FIG. 1, the lands and the annular discs are curved such that the annular passages between the lands, while having substantially radially extending inlet areas, have outlet areas which are inclined in one direction with respect to the axis of the load member. The discs disposed between the lands are curved accordingly and are essentially dish-shaped. However, the inclined area may also be provided at the inlet end of the fluid passages 8. Such arrangements center the bearing portions of the load and support members relative to each other because radial fluid pressure forces occur in the inclined portions of the passages. Furthermore, with discs of uniform thickness, the spacing between the discs is smallest where the inclination of the passages is largest such that, in the arrangement of FIG. 1, for example, passages 8 of decreasing width are formed between discs of uniform thickness as more clearly shown in FIG. 2.

Figure 2:
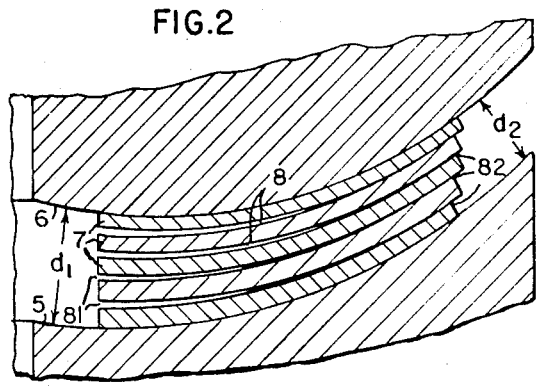
FIG. 2 shows the land area of the bearing with a number of discs disposed between the lands.

In the example shown in FIG. 2, five annular discs 7 of uniform thickness are disposed between the lands 5 and 6. As can be readily seen, the distance d1 between the lands is larger at the entrance end of the fluid path than the distance d2 at the exit end of the fluid path so that gaps 81 are formed between the annular discs 7 at the entrance end of the fluid path. The discs 7, when not separated from each other by pressurized fluid, contact each other in the area of their greatest inclination with respect to a plane normal to the axis of the bearing structure which, in the arrangement shown in FIG. 2, is at the exit end of the fluid path.

If there is a relatively large inclination of the land surfaces and the discs near the exit end of the fluid passage, the gaps 81 are relatively large permitting the pressurized fluid to maintain between the discs 7 and adjacent the lands 5 and 6 a relatively large pressure which drops sharply only at the radially outer ends of the discs 7, where a relatively small gap 82 is formed. This may cause occasional contact between the rings at their outer edges.

Figure 3:
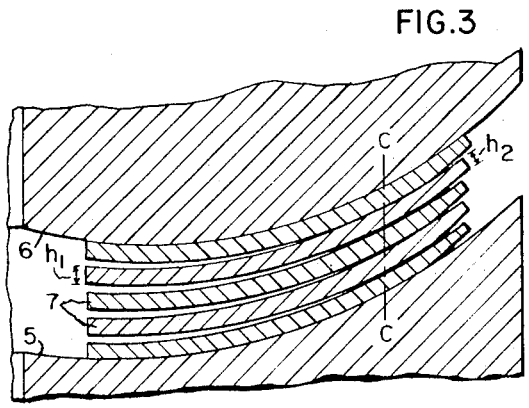
FIGS. 3 to 9 show arrangements of various discs disposed between the lands.

Therefore, in one embodiment of the invention as shown in FIG. 3, the thickness of the discs 7 is reduced at their radially outer end where the thickness is only h2 as compared to h1 at the inner end such that contact between the discs may occur only at an area C somewhat removed from the exit end of the flow path. This arrangement substantially reduces the probability of contact occurring between adjacent surfaces because of pressure build-up in the smallest width area of the fluid passages between the discs 7.

Figure 4:
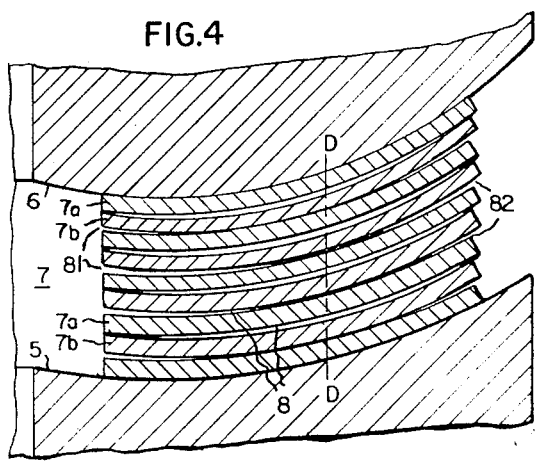

FIG. 4 shows an embodiment of the invention in which rings of different curvature 7a and 7b are alternately disposed between the land surfaces 5 and 6 so that two adjacent rings 7a and 7b engage each other at their radially inner and outer ends and, together, form a composite annular disc 7. Adjacent composite discs 7 form therebetween passages which have their smallest width at D from which area the width of the passages increases toward the radially inner and outer ends 81 and 82 of the leakage paths. As shown in FIG. 4 the rings 7a have a larger radius of curvature than the rings 7b so that between each ring 7a and the adjacent ring 7b disposed, at the, with respect to the center of curvature, inner side of the ring 7a, a fluid flow passage 8 is formed. The ring 7b, disposed at the, with respect to the center of curvature, outer side of ring 7a engages the ring 7a at the fluid inlet and outlet ends so that no fluid flow path is formed therebetween.

In such an arrangement, the rings forming a composite disc are exposed to different pressures on opposite sides and yield somewhat such that the divergence rate of the fluid flow passages will decrease when the fluid pressure increases. However, the rings can be made stiff enough to maintain operative divergence rates at rated pressures.

This arrangement takes more bearing space than the arrangement shown in FIG. 3 but it provides for a resilient bearing structure which accommodates considerable vibration, out-of-line running or wobble of the load member.

Figure 5:
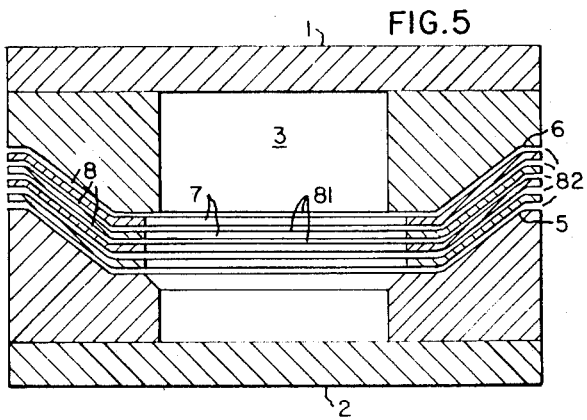
Figure 6:
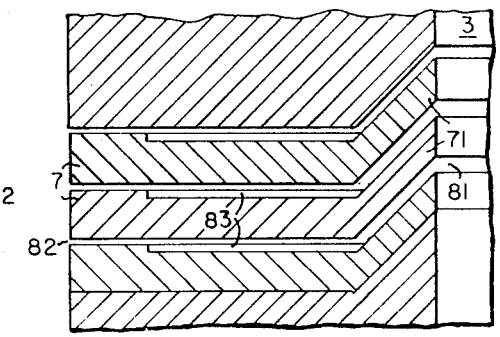

FIG. 5 shows an arrangement wherein the fluid path between lands 5 and 6 and the discs 7 disposed in the fluid path are dish-shaped forming therebetween passages 8 with essentially radial inlet areas 81 and outlet areas 82, the intermediate area being inclined in one direction with respect to the axis of the load member 1 and the support member 2.

Such an arrangement provides fluid passages 8 along the discs 7 which are wider in the inlet and outlet areas 81 and 82 than in the intermediate area with the discs 7 being of uniform thickness.

Figure 7:
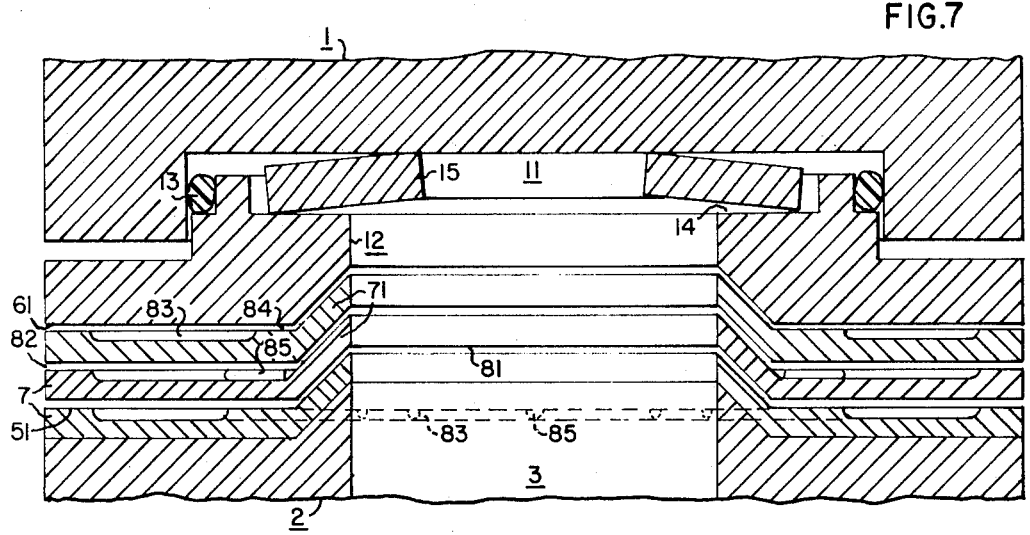

As shown in FIGS. 6 to 9, the discs 7 may also be formed to be essentially flat with inclined edge portions 71 provided at their radially inner inlet ends adjacent the cavity 3. In these arrangements, the discs 7 are formed to provide relatively wide fluid entrance passages 81 in which, under normal conditions that is when all the discs 7 are centered relative to each other, only little pressure drop occurs wherein, however, pressure builds up rapidly wherever the clearance decreases thereby maintaining the discs 7 properly centered with respect to each other. The discs are formed to provide intermediate passage areas 83 which are narrow enough to cause considerable pressure drop. At their radially outer ends the discs 7 are thicker so that the width of the exit area 82 in which the rest of the pressure drop occurs is reduced. As shown in FIG. 7, a relatively narrow path may also be formed at an area 84 adjacent the entrance area 81. In the area 84, however, grooves 85 are formed in the discs 7 to insure pressurization of the intermediate passage areas 83 when adjacent discs are in contact with each other. In this case, the passages in the exit areas 82 are somewhat shorter to compensate for the reduced pressure in the intermediate passage areas 83 as caused by the pressure drop in the relatively narrow area 84.

Figure 8:
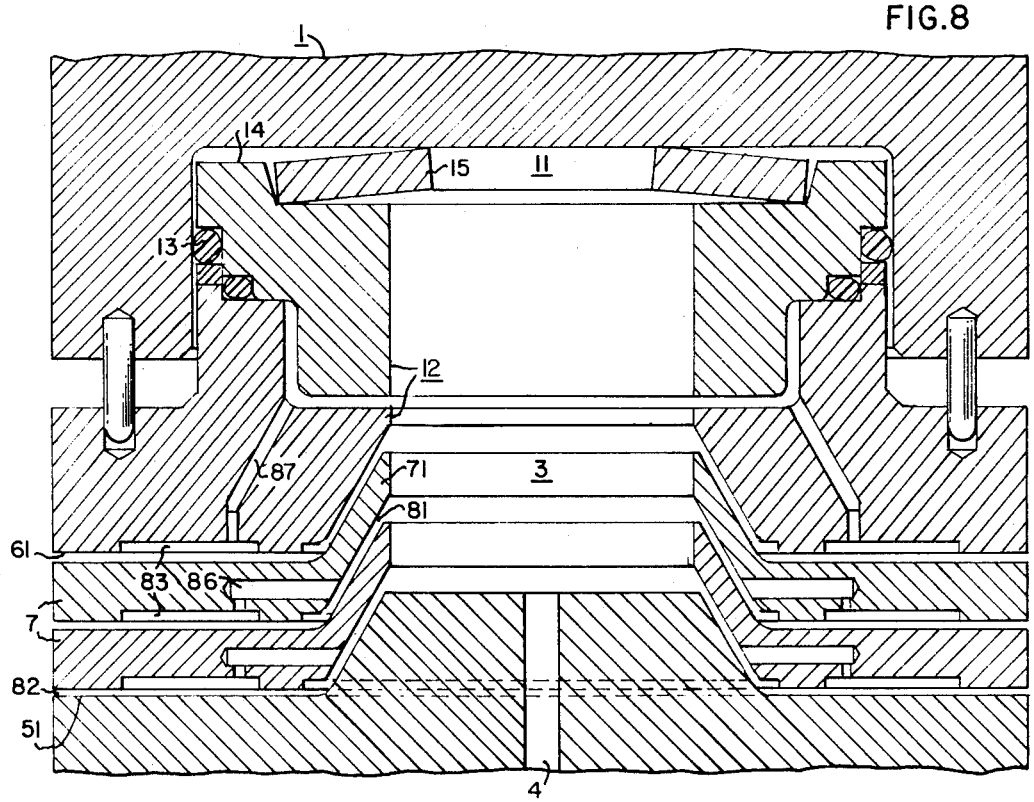

The disc arrangement shown in FIG. 8 is similar to that of FIG. 7 except that, instead of the grooves 85, control channels 86 and 87 are provided to insure pressurization of the intermediate passage areas 83. The control channels 86 provide communication between the intermediate passage area 83 and the entrance area 81 or, as shown for the floating ring 12 the control channels 87 provide communication between the intermediate passage area 83 and the cavity 3.

Figure 9:
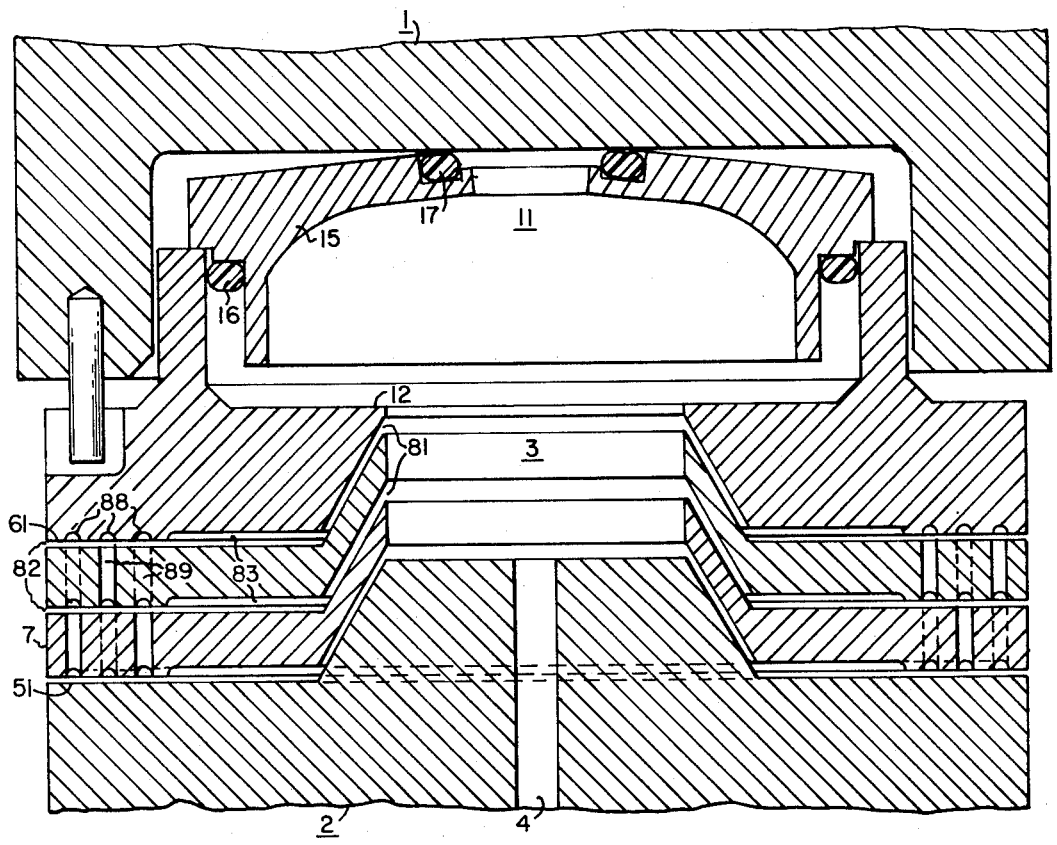

As shown in FIGS. 7 to 9 the arrangement may include a floating ring as described for example in this applicant's earlier U.S. Pat. No. 3,619,016. One of the support and load members, for example the load member 1, may have a cavity 11 receiving the floating ring 12 which has a land surface 61 opposite the land surface 51 of the support member 2. The floating ring 12 is movable in axial direction within the cavity 11 to permit variation of the leakage passage gaps. A seal 13 is disposed between the floating ring 12 and the side walls of the cavity 11 to prevent uncontrolled leakage of pressurized fluid from the cavity. Preferably, the rear surface 14 of the floating ring 12 which is exposed to the high pressure fluid in the cavity 11 is substantially smaller than the land surface 61 of the floating ring 12 so that the axial force on the floating ring 12 as caused by the fluid pressure on the land surface 61 is substantially larger than the oppositely directed axial force caused by the high fluid pressure on the rear surface 14 of the floating ring 12, the floating ring 12 being maintained in balance by a relatively strong spring, preferably a Belleville spring 15.

The spring force is a function of the fluid operating pressure and must increase very rapidly with only small deflections as the operating pressure increases, that is, the spring must have a high spring rate. If, for example, in a particular thrust bearing the full load pressure on the floating ring is 1,500 psi with 400 pounds contributed by the spring, the spring rate would typically be 40,000 lb/in. In the particular bearings shown in the drawings spring rates of at least 5,000 lb/in. are considered necessary with a floating ring diameter of about 5 inches. The deflection of the spring is very limited, preferably less than 0.02 in.

This arrangement is especially advantageous if the load and support members should not make substantial axial movements toward and from each other. The gap size of the fluid flow passage is then automatically adjusted by asking more or less of the spring. The spring also compensates in a simple manner for inaccuracies in dimensions, for obstructions by dirt and for variations in the fluid flow volume.

During rotation of the load member relative to the support member, shearing forces occur in the fluid films present in the passages formed between the land surfaces. This causes an energy consuming drag which keeps the free floating discs moving at speeds between the speeds of the support and load members. The energy consumed depends to a large extent on the difference of the speed between adjacent surfaces which difference is substantially reduced, if, in accordance with the present invention, one or more discs are floating between the land surfaces.

Assuming, for example, that the support member rests and the load member rotates at 20,000 rpm, with nineteen discs disposed between the land surfaces, the speed difference between adjacent surfaces will be only 1,000 rpm. Such reduction in the speed difference between adjacent surfaces is of great advantage since the losses due to shear increase with the speed difference at a rate equal to a square function of the speed difference.

Also, occasional contact between adjacent surfaces due to vibration wobble, dirt, or uneven surfaces is of no harm because the relative speeds are low and the discs are resiliently floating between the lands and, furthermore, have only very small masses.

With the arrangement according to the invention, the combined width of all flow passages between the lands can be made substantially larger than the width of a single passage with equal fluid pressures and fluid flows.

With N passages provided between the lands, the total gap flow width of the N fluid flow passages between the lands is N two-thirds times the width and the shear losses are 1/N five-thirds times that of a single gap flow path with equal fluid pressure and fluid flow. For example, with N=5, the total width of the five passages forming the path between the lands is 2.9 times the width of a single gap path and the shear losses are only 1/14.6 or only 7 percent of those obtained for a bearing with a single gap fluid flow path.

The invention is, of course, not restricted to the arrangements shown in the embodiments as described. The annular discs disposed between the lands may be flat, for example, especially if the bearing structure is not intended to accommodate any radial forces. It is, however, necessary to have some provision causing separation of the discs in the bearing structure to form the various fluid flow passages. Separation of flat discs may be insured, for example, by a reduction of the thickness of the discs at the entrance end of the fluid flow path or by radial grooves which permit the pressurized fluid to enter the passages between adjacent discs for separation thereof.

Also, as shown in FIG. 9, areas of the same pressure between the discs may be in communication with each other by passages 88 extending between annular grooves 89 formed in the faces of the discs. Furthermore, as also indicated in FIG. 9, seals 16 and 17 may be provided at the radially inner and outer ends of the Belleville spring 15, no seals being provided between the floating ring 12 and the side walls of the cavity 11 so that the Belleville spring 15 is exposed only at one side to the high pressure fluid in the cavity 11. Further, the Belleville spring 15 may be integral with or firmly connected to, the floating ring 12 as by welding so that seal 16 is not necessary. Also, the Belleville type spring may consist of a circular plate to eliminate the need for any seal.

What we claim is:

1. In a hydrostatic thrust bearing including: a support member; a rotatable load member disposed adjacent said support member, said members having a cavity formed therebetween; and means for admitting a pressurized fluid to said cavity for supporting said load member on said support member, said members having opposite lands extending around said cavity and forming a leakage path for the fluid admitted to said cavity, the improvement comprising: at least one annular disc disposed between said opposite lands and dividing said leakage path into at least two parallel passages, each disc being freely rotatable in said leakage path to provide, during rotation of said load member, smaller relative speeds between adjacent surfaces of said parallel passages than between said support and load members.

2. A bearing as claimed in claim 1, wherein the lands and discs are spaced from each other at the entrance end of said leakage path thereby to ensure separation of the discs when fluid passes through the leakage path.

3. A bearing as claimed in claim 2, wherein each disc is of uniform thickness but the land surfaces and each disc disposed therebetween are curved in the form of a dish having essentially radial inlet areas thereby providing a space between adjacent discs at the radially inner entrance end of the leakage path.

4. A bearing as claimed in claim 2, wherein the discs are of reduced thickness at their radially inner ends.

5. A bearing as claimed in claim 3, wherein said discs are of reduced thickness at their radially outer end to provide diverging exit areas for said fluid passages.

6. A bearing as claimed in claim 1, wherein each disc is composed of two rings having different curvatures and engaging each other only at their radially inner and outer ends, thereby providing passages of increased width at the entrance and exit ends of said leakage paths.

7. A bearing as claimed in claim 1, wherein the land surfaces and the discs therebetween are dish-shaped providing essentially axial inlet and outlet fluid passage areas and intermediate areas which are inclined with respect to the inlet and outlet areas, the discs being of uniform thickness.

8. A bearing as claimed in claim 1, wherein said discs are essentially flat but have inclined radially inner end portions.

9. A bearing as claimed in claim 8, wherein said discs are formed to provide narrower exit passage areas than inlet passage areas.

10. A bearing as claimed in claim 8, wherein there are provided adjacent the inclined inner end portions annular passage areas which have essentially the same width as the exit areas, said discs having radial grooves formed therein in said annular passage areas to insure pressurization of all the passages and separation of all discs.

11. A bearing as claimed in claim 8, wherein there are provided adjacent the inclined inner end portions annular passage areas which have essentially the same width as the exit areas with an intermediate passage area of greater width between the inlet and exit areas and wherein control channels are provided bypassing the annular passage areas adjacent the inclined inner end portions to insure pressurization of said intermediate passage area.

12. A bearing as claimed in claim 1, wherein one of said lands is associated with a floating ring axially movably disposed in a pressurized fluid filled cavity formed in one of said load and support members, the rear surface of the floating ring which is exposed to the pressurized fluid being substantially smaller than its land surface so that the axial force caused by the fluid pressure on the land surface is substantially larger than the oppositely directed axial force caused by the fluid pressure on said rear surface and a spring with high spring rate is effective on said floating ring to maintain the floating ring in balance.

13. A bearing as claimed in claim 12, wherein said spring is a Belleville spring disposed between the floating ring and cavity end wall.

14. A bearing as claimed in claim 12, wherein said ring has a spring rate high enough to permit a total spring deflection of less than 0.02 inches.

15. A bearing as claimed in claim 1, wherein areas of the same pressure in said parallel passage are in communication with each other by communication passages formed in said discs.

16. In a hydrostatic bearing including: a support member; a rotatable load member disposed adjacent said support member, one of said members having a cavity formed therein adjacent the other member; means for admitting pressurized fluid to said cavity; and a floating ring axially movably disposed in said cavity, said floating ring and said other member having opposite land surfaces to provide a controlled fluid leakage path therebetween; the improvement comprising a circular spring disposed between said floating ring and said one member and sealingly engaging at its outer end said floating ring and abutting the walls of said cavity to prevent uncontrolled fluid leakage therefrom.

17. A bearing as claimed in claim 16, wherein said circular spring is an annular Belleville type spring having sealing means disposed at its contact areas with the floating ring and the cavity walls.

18. A bearing as claimed in claim 16, wherein said circular spring is a disc made integral with the floating ring.

* * * * *